Nov. 20, 1951      A. G. ROSE      2,575,684
TROLLEY CONVEYER DRIVE
Filed Oct. 11, 1944      4 Sheets-Sheet 1
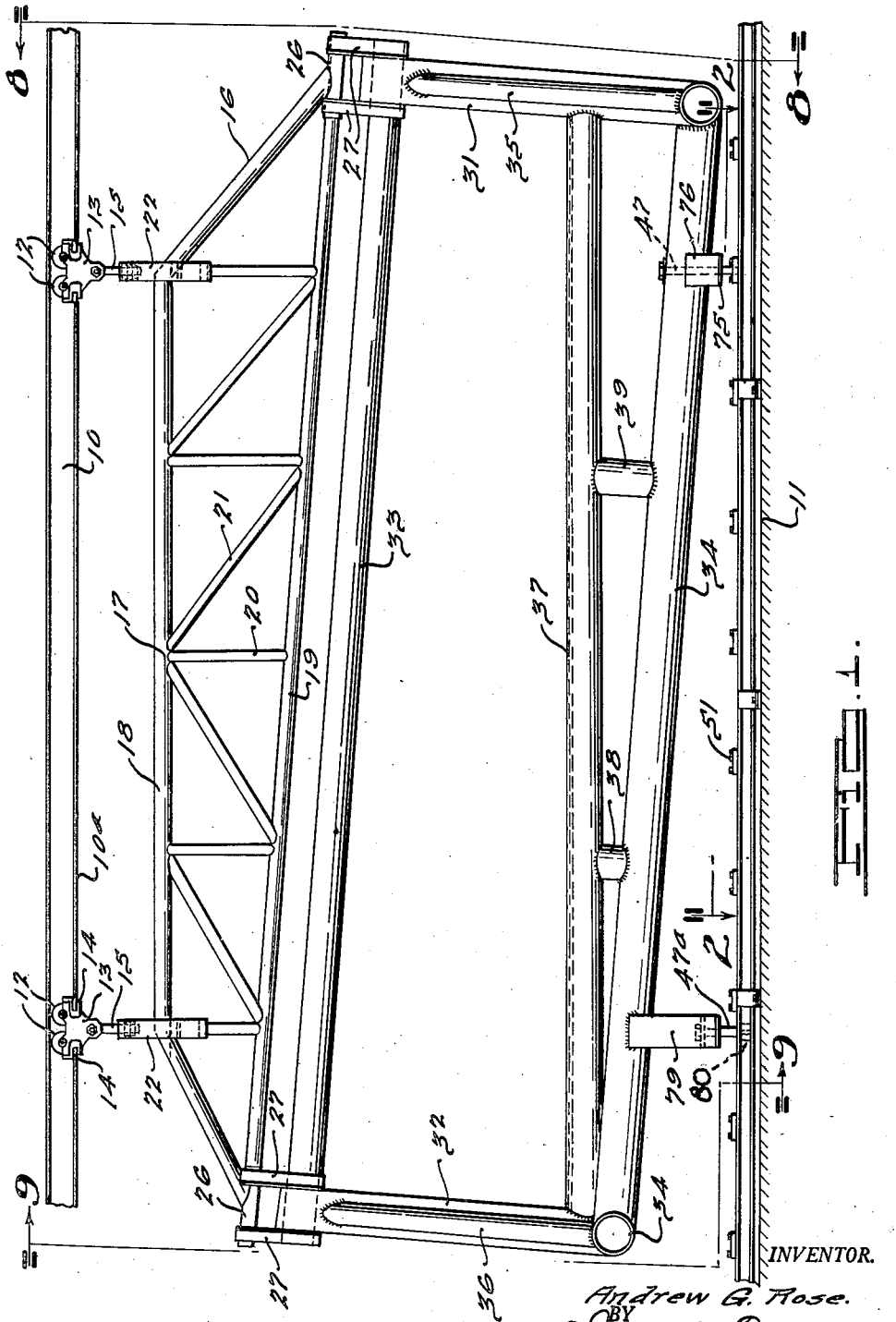
INVENTOR.
Andrew G. Rose.
BY Joseph Darley
ATTORNEY.

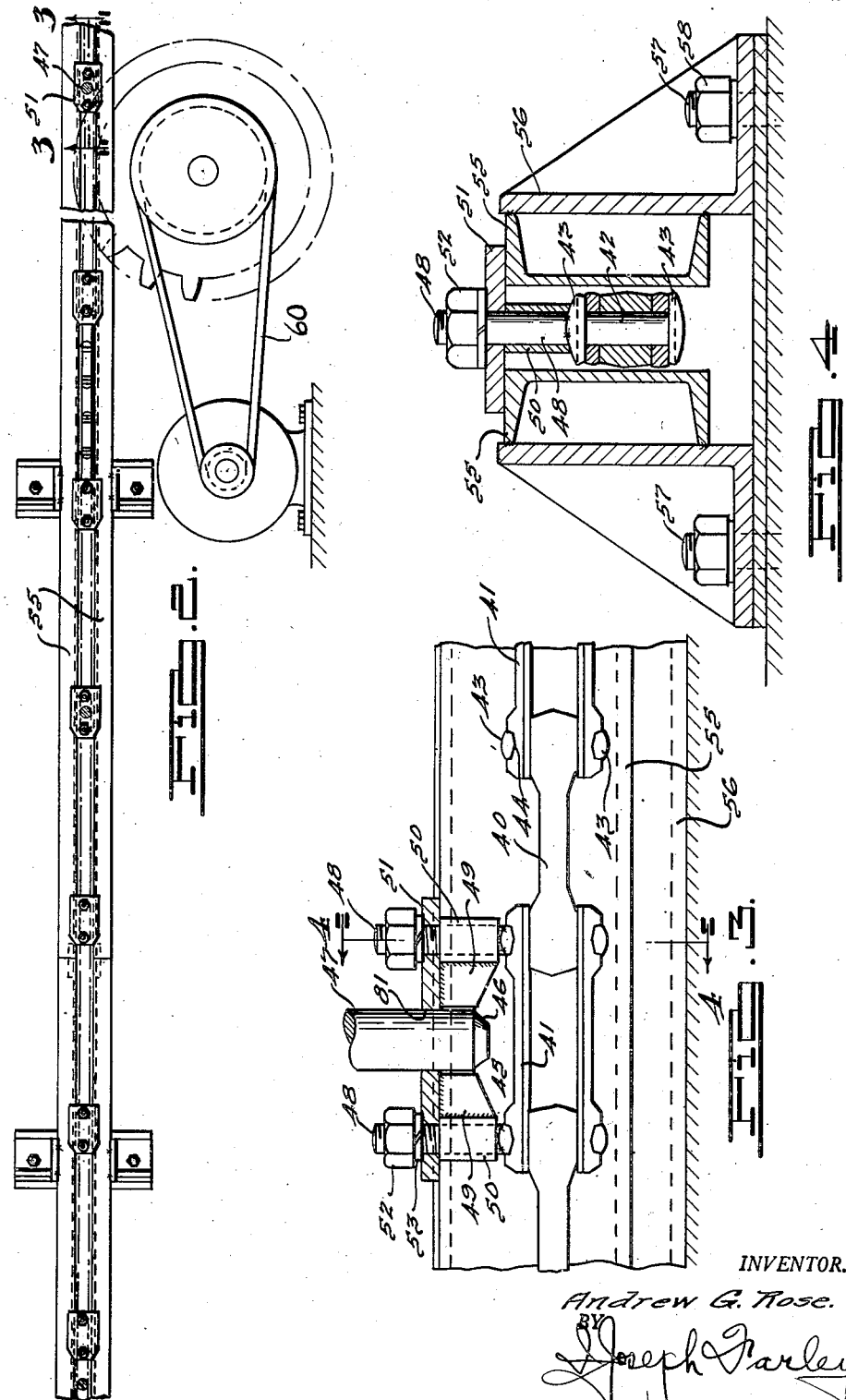

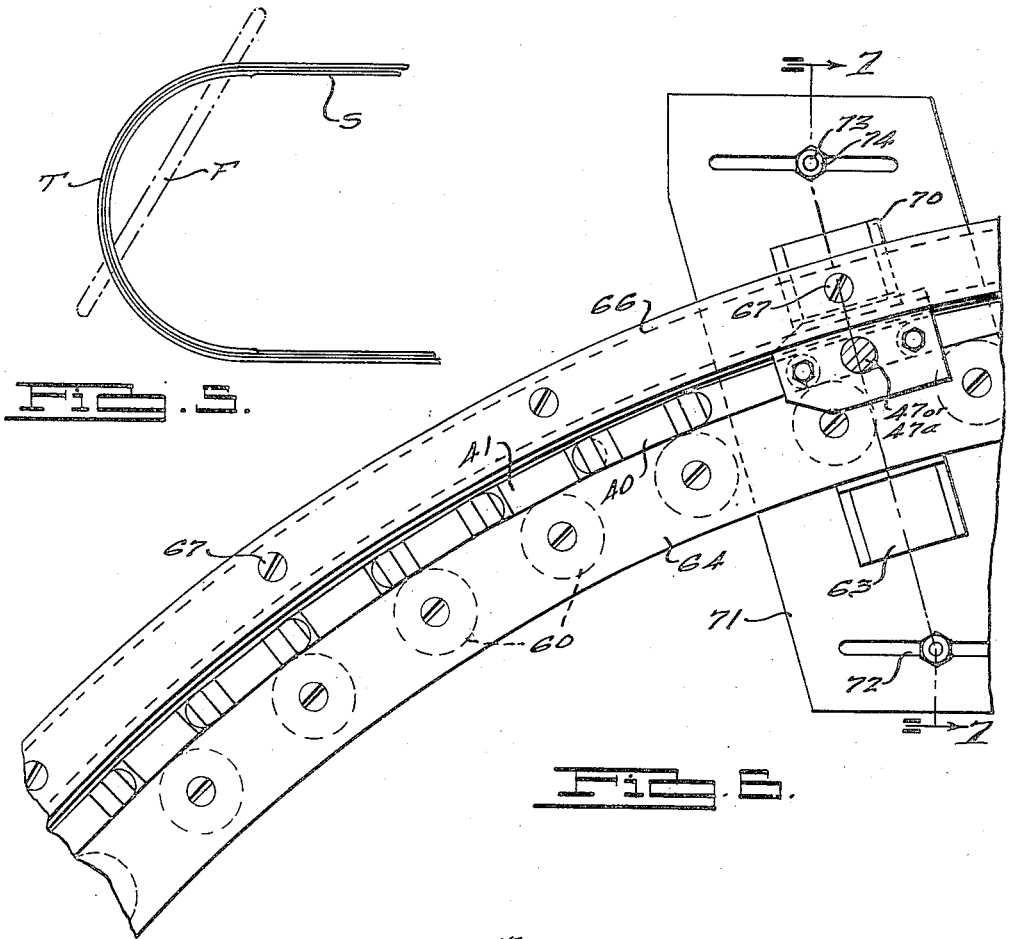

Nov. 20, 1951  A. G. ROSE  2,575,684
TROLLEY CONVEYER DRIVE
Filed Oct. 11, 1944  4 Sheets-Sheet 4
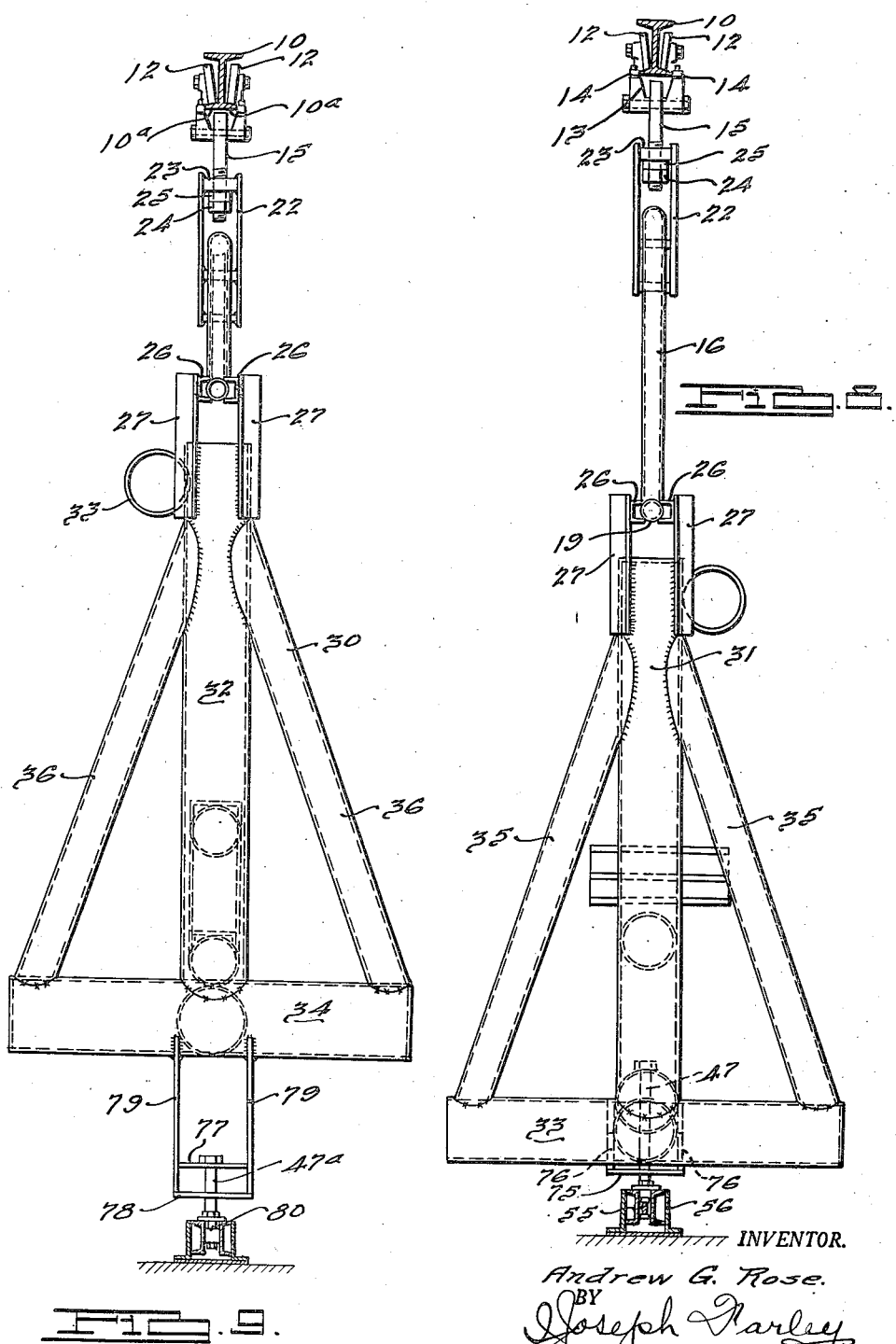
INVENTOR.
Andrew G. Rose.
BY Joseph Harley
ATTORNEY.

Patented Nov. 20, 1951

2,575,684

UNITED STATES PATENT OFFICE 2,575,684

TROLLEY CONVEYER DRIVE

Andrew G. Rose, Detroit, Mich., assignor to Jervis B. Webb Company, Detroit, Mich., a corporation of Michigan Application October 11, 1944, Serial No. 558,167

4 Claims. (Cl. 198—129)

This invention relates to conveyors and particularly to that type of conveyor known as a trolley conveyor by means of which articles to be transported from one part of a manufacturing plant are moved to another part thereof while supported upon what are known in the art as trolley brackets. These trolley conveyors usually consist of a suitable overhead supporting track usually in the form of a structural steel I-beam or angle members on the lower flanges of which trolley wheels are adapted to run, the trolley wheels being carried by supporting brackets, which in turn are suitably connected to a power driven endless chain for propelling the brackets along the supporting track. The brackets are secured at spaced intervals along the chain and are commonly provided with a load supporting hook or clevis so that the weight of the articles carried is supported directly by the bracket from the trolley track.

As all power driven trolley conveyor installations include an endless chain drive, and also as it is common practice to construct trolley conveyor installations so that the articles to be conveyed may be caused to travel along different areas or work stations in a manufacturing plant, it is necessary to provide curves or turns in the conveyor installation. When the articles to be transported are sufficiently compact that they may be carried by a single trolley bracket, no difficulty is encountered in conveying the articles around the various curves and bends in the line of the conveyor's travel. When, however, the articles to be transported are relatively large and bulky, such for example as wing or fuselage sections of airplanes, the length of such parts precludes the conveying of them by the use of a single trolley bracket for each part unless the parts are supported with their longitudinal dimension in a vertical or upright position. Due to the great length of airplane wing sections and fuselage parts, it is not feasible to transport them by means of a trolley conveyor with the parts carried vertically because of space restrictions, as it would require that the supporting tracks be placed at an excessively great distance from the floor of the building. Because of the fact that such parts are many feet in length, it becomes necessary to use at least two trolley supporting brackets which, in order to insure horizontal stability of the parts as they are being carried, must be spaced several feet apart. As trolley conveyor installations always include either horizontal or vertical turns, if two trolley brackets are connected to the article to be carried to the power driven propulsion chain, difficulty is encountered at the turns due to the fact that the connection from the trolley brackets to the part to be carried are a fixed spaced distance apart with the result that the propelling chain must travel around a curved arc at the turns while the lengthy article bridges across a chord line of the curved arc which chord is of much smaller linear dimension than the path of travel of the chain around the curve.

One of the principal objects of the present invention is therefore to provide a new and improved construction for a trolley conveyor especially designed for the conveying or transporting of lengthy, bulky articles and in which the difficulties above set forth will be obviated.

Another object is to provide a trolley conveyor in which the article to be carried is supported by trolley brackets that are independent of the driven propulsion chain.

A further object of the present invention is to provide a new and improved construction for a trolley conveyor of the type set forth in which the articles to be transported are supported by trolley brackets from an overhead supporting track, while the power driven propulsion chain is suitably supported, as on the floor of the plant, entirely independent of the supporting trolley brackets but with a suitable driving connection between the driven chain and the articles to be carried.

Another object of the invention is to provide a new and improved construction of an article-carrying bracket or fixture with suitable connections between said fixture and the weight supporting trolley backets as well as suitable connections between the fixture and power driven propulsion chain.

The above and other objects of the present invention will appear more fully from the following more detailed description and by reference to the accompanying drawings forming a part hereof and wherein:

Fig. 1 is a side elevation of a conveyor constructed in accordance with the principles of the present invention;

Fig. 2 is a horizontal plan view partly in section of the propelling chain and housing therefor taken substantially on the line 2—2 of Fig. 1;

Fig. 3 is an enlarged vertical sectional detail taken substantially on the line 3—3 of Fig. 2, and showing the driving connection between the propelling chain and the article-carrying fixture;

Fig. 4 is a transverse vertical section taken substantially on the line 4—4 of Fig. 3;

Fig. 5 is a somewhat diagrammatic view, showing the relationship between the article being carried and the conveyor as the article is traveling around a curve or turn of the conveyor;

Fig. 6 is an enlarged plan view partly in section of a portion of the propelling chain at one of the conveyor turns;

Fig. 7 is an enlarged sectional detail taken on the line 7—7 of Fig. 6;

Fig. 8 is a section taken substantially on the line 8—8 of Fig. 1, showing an article-carrying fixture as seen from one end thereof; and Fig. 9 is a view similar to Fig. 8 showing the fixture as viewed from the opposite end.

As shown in the drawings, the numeral 10 indicates the supporting track for the overhead trolleys, which track is suitably secured to the steel or other supporting frame work and spaced some distance above the floor 11 over which the articles are intended to be transported. The supporting track may be of any suitable construction, but as shown in Figs. 8 and 9, preferably consists of structural I-beam sections, the lower horizontal flanges 10-a of which serve as supporting tracks upon which the trolley wheels 12 are adapted to roll. The trolley wheels 12 are rotatably carried by trolley brackets 13, there preferably being two pairs of the wheels 12 for each bracket, one pair of wheels engaging with and being supported by the upper face of the lower horizontal flange 10-a on one side of the I-beam track member 10 and the other pair engaging the horizontal flange 10-a on the other side of such track. In order to give greater lateral stability to the brackets 13, each bracket is provided on each side thereof with a pair of guide rollers 14, which engage the outer side edges of the flanges 10-a. Each of the brackets 13 has suitably secured thereto a depending stud bolt 15 for connecting the bracket to a suitable article-carrying jig or fixture indicated generally by the numeral 16.

The article-carrying jig obviously may be of any suitable size, shape, configuration and construction depending upon the nature of the article to be carried, the jig shown in the drawings being illustrative of the type of construction that has been found highly satisfactory in practice for the transporting of airplane parts, such as wing or fuselage sections.

As shown in Figs. 1, 8 and 9 of the drawing, the jig 16 consists of an upper framework consisting of a truss-like member 17 consisting of upper and lower stringers 18 and 19 which are suitably connected together and braced by the cross and diagonal struts 20 and 21, respectively. An upper framework 17 is provided adjacent to its ends with strap-like attachment brackets 22 secured at their lower ends to the upper framework and having their upper ends projecting above the upper longitudinal member 18, each of the strap members having a transverse cross bar 23 provided with an aperture for the reception of the lower end of the bracket bolts 15 upon which a nut 24 is threaded, a washer 25 being interposed between the nut 24 and the cross bar 23.

At its lower end the upper framework has secured to the end portions of the longitudinal member 19 a pair of short channel pieces 26, which engage the opposite sides of the tubular longitudinal member 19 and are securely welded thereto. Each chanel 26 has secured to it a pair of connecting bars 27 which may be in the form of angle irons to the lower end of which the main body or article-carrying portion of the fixture is secured.

The main body portion of the fixture indicated generally by the numeral 30 consists of a pair of vertically extending end posts 31, 32, an upper longitudinally extending member 33 and a lower member 34, both of which, as shown, are inclined to the horizontal. At their lower ends, each of the members 31, 32 have suitably secured thereto, as by welding, the bottom transverse members 33, 34 from the side edge portions of which the inclined diagonal braces 35 and 36, respectively, extend upwardly to be secured at their upper ends to the vertical post 31, 32. Extending between the posts 31 and 32 is a horizontally extending article supporting member 37, which is braced at suitable intervals and connected to the lower longitudinal frame member 35 by upright bracing pieces 38, 39.

As clearly shown in the drawings, all of the main frame members above described are preferably constructed of pipe sections which are fitted to each other and securely welded at their meeting points to form a rigid integral structure.

As will be seen from the foregoing, the article-carrying fixture or jig is entirely supported from the overhead trolley track 10 by means of the trolley brackets 13, each of which is provided with two pairs of trolley wheels 12 that engage the lower flanges 10-a provided on the opposite side faces of the I-beam track 10 and so that the entire fixture is freely movable along the said supporting track.

Located immediately below the supporting track 10 and in vertical alignment therewith is a power driven propulsion chain. This chain, as shown most clearly in Figs. 3 and 4 of the drawing, is preferably of the type of chain known in the art as a keystone rivetless chain and consists of a series of alternately-arranged chain links 40 and side bars 41 which are connected together by the headed pins 42; the pins 42 being provided with transversely extending integral heads 43 that are adapted to seat within recesses 44 formed for their reception in the faces of the side bars 41.

At suitable intervals along the line of the chain, certain of the upper side bars 41 are provided with a driving block portion or saddle 45 formed integrally with the side bar and having formed in the upper face thereof a socket or recess 46 for the reception of the lower end of a driving bolt 47. At those places along the chain where the driving blocks 45 are provided, the standard headed pins 42 of the keystone chain have welded to them an upwardly extending stud bolt extension 48. A pair of filler pieces each consisting of a small piece of strap material 49, to the outer end of which is welded a piece of pipe or sleeve-like member 50, have suitably secured to them, as by welding, a strap or slide plate 51.

As clearly shown in Figs. 3 and 4, the bolt extensions 48 are adapted to pass through the sleeves 50 of the filler pieces, and said bolt extensions are provided with nuts and lock washers 52, 53, respectively. The slide plate 51 rests upon the upper faces of a pair of channel members 55 which are supported at intervals along the line of the conveyor's travel by knee brackets 56, suitably secured to the floor of the building as by the stud bolts 57 and nuts 58.

As will be evident from the foregoing, the channel members 55 form a housing for the propulsion chain, which is supported between the opposed vertically-arranged webs of the channel members in pre-determined spaced relationship to the top flanges thereof by means of the slide plates or straps 51 and bolts 48, the slide plates 51 resting on the top faces of the channel members and being adapted to slide along said faces as the chain is driven.

Suitable driving means, such as indicated at 60, Fig. 2, is provided for propelling the chain. It will, of course, be understood that the chain is an endless chain and that its line of travel corresponds with the line of travel of the supporting track 10. At the points where a turn is made in the conveyor's line of travel, guide means are provided for the propulsion chain, such guide means are preferably in the form of what is known in the art as roller turns. These roller turns consist of a plurality of rollers 60 arranged at suitably spaced intervals on the inner side of the turns, as shown in Fig. 6. These rollers are mounted between a pair of curved flat bars 62 and 64 supported at spaced intervals by knee brackets 63, each of the rollers 60 being rotatably mounted upon a bolt 64-a. The outer section of each roller turn is formed by a length of angle iron 65 to the horizontal web of which a curved flat retaining plate 66 is secured, the plate 66 being held in spaced relationship to the upper horizontal web of the angle member 65 by bolts 67, upon which spacing collars 68 are mounted, nuts 69 being threaded upon the bolts 67 to hold the parts in securely assembled position. The angle iron 65 is also suitably supported upon angle brackets 70.

As it is necessary to provide means to take up slack in the conveyor chain caused by wear or by expansion due to changes in temperature, the roller turn sections are mounted upon an adjustment plate 71 which is provided with elongated slots 72 through which pass the anchor bolts 73 provided with nuts 74 for securely tightening the adjustment plates 71 to the floor of the building; it being understood that such an adjustment is provided at both sides of the turn.

As shown in Fig. 5 of the drawing, which indicates diagrammatically upon a reduced scale a turn in the line of the conveyor travel, the reference character T indicates the line of travel of the propulsion chain around the turn, the reference character S indicating the straight line of travel of the conveyor. F indicates diagrammatically the article-carrying jig or fixture. As clearly shown in this diagrammatic view when the fixture F is traversing a turn and occupies a position such as indicated in the drawing, it extends across a chord line of the arc of curvature, in which the curved section T of the track is formed. Obviously the distance between the points at which the fixture F intersects the curved section T is of much shorter linear length than the distance around the curved track between such two points of intersection. In view of this fact, if the propulsion chain were directly connected to the supporting trolley brackets 13, jamming of the propulsion chain would inevitably result. According to the present invention, therefore, the power drive is not imparted to the supporting trolley brackets 13, but it is imparted to the article-carrying fixture independently of the trolley brackets by means of the propulsion chain. In order to drive the fixture by the propulsion chain, the fixture has secured to it immediately below and in vertical alignment with each of the trolley brackets 13, the bolts 47, 47-a. The bolt 47 passes through the lower longitudinal member 34 of the fixture and is braced at its lower end by a transverse bracing member 75, secured to the lower end of a pair of depending straps 76, welded to the outside of the member 34 while the bolt 47-a is carried by a pair of similar transverse members 77, 78 secured to the lower ends of a pair of depending straps 79, likewise secured at their upper ends to the longitudinal member 34. The bolt 47 is adapted to engage in one of the recesses or sockets provided in the driving blocks 45 secured to the upper side bars 41 at spaced intervals along the line of the conveyor's travel. The bolt 47-a is not, however, connected to the propelling chain, but terminates above the level of the propelling chain, projecting downward a short distance between the inner faces of the opposed vertical webs of the channel sections 55.

As will be readily understood, the links and side bars of the rivetless keystone chain are assembled in the usual manner. At predetermined spaced intervals certain pins 42 of the keystone chain are provided with the headed bolt extensions 48. Each pair of bolt extensions at these points have secured to them the slide plates 51 which serve to hold the chain in pre-determined spaced relationship to the top faces of the channel members 55. At other spaced intervals the bolt extensions 48 have placed on them the filler pieces 49, 50 and a similar sliding plate 51, the filler pieces 49 cooperating with the recess or socket 46 provided in the driving blocks 45 and with a central hole 81 provided in the sliding plates 51 to engage the bolt 47 and communicate the drive of the propelling chain to the article-carrying fixture.

It will thus be seen that when the article-carrying fixture is mounted upon the supporting overhead track 10 by means of the trolley brackets 13, the bolt 47 is inserted in the lower part of the article-carrying fixture and engaged with driving blocks 45 of the propelling chain and with the bolt 47-a extending between the faces of the channel members 55 above the level of the propelling chain. When the conveyor is put in operation, the travel of the propelling chain is communicated to the fixture, which is supported by the trolley brackets 13 from the track 10, the fixture traveling freely along the track 10. The line of travel of the track 10 coincides with the line of travel of the propelling chain and is located in vertical alignment therewith. The driving connection furnished by the pin 47 between the propelling chain and the article-carrying fixture is preferably located at the front end of the fixture. The location of the bolts 47, 47-a immediately below and in vertical alignment with the trolley brackets 13 insures lateral stability to the fixture and prevents objectionable swinging or swaying of the fixture as it is moved along the conveyor. Likewise the stabilizing effect of the bolts 47, 47-a serves to hold the fixture and workpiece carried thereby against lateral movement when operators stationed along the line are performing fabricating operations upon the article.

As the article reaches a turn in the conveyor, the pin 47-a tracks along between the inner and outer sections of the roller turns, but is naturally caused to swing outwardly against the inner side wall of the angle section 65. Because of the fact, however, that the lower end of the pin 47-a is not directly connected to the propelling chain, no difficulty is experienced because of the fact that a greater linear length of the propelling chain is contained in the curved section than the distance across the chord line of the chain's travel intersected by the fixtures, as indicated in Fig. 5.

Having thus described my invention, what I claim is:

1. A conveyor system for transporting rigid loads having large longitudinal and vertical dimensions comprising an elevated conveyor track having straight and curved sections, a pair of longitudinally separated trolleys connected at fixed points to opposite ends of each of said loads for suspending said load from said track, the vertical plane of said trolleys and load forming a chord relationship with a curved portion of said track in passing therearound, said load extending downwardly to a position adjacent floor level, a propelling chain at floor level following a corresponding path below said track, and a drive connection between said load and said chain directly below one of said trolleys.

2. A conveyor system for transporting rigid loads having large longitudinal and vertical dimensions comprising an elevated conveyor track having straight and curved sections, a pair of longitudinally separated trolleys connected at fixed points to opposite ends of each of said loads for suspending said load from said track, the vertical plane of said trolleys and load forming a chord relationship with a curved portion of said track in passing therearound, said load extending downwardly to a position adjacent floor level, a propelling chain at floor level following a corresponding path below said track, a drive connection between said load and said chain directly below one of said trolleys, and a housing track for said chain constructed also as a guide for said driving connection to impart lateral stability to said load.

3. A conveyor system for transporting rigid loads having large longitudinal and vertical dimensions comprising an elevated conveyor track having straight and curved sections, a pair of longitudinally separated trolleys connected at fixed points to opposite ends of each of said loads for suspending said load from said track, the vertical plane of said trolleys and load forming a chord relationship with a curved portion of said track in passing therearound, said load extending downwardly to a position adjacent floor level, a propelling chain at floor level following a corresponding path below said track, a drive connection between said load and said chain directly below one of said trolleys, a housing track for said chain constructed also as a guide for said driving connection to impart lateral stability to said load, and a guide connection between said load and chain track directly below the other of said supporting trolleys extending within the guide portion of said chain track but having no connection with said drive chain.

4. A conveyor system as set forth in claim 1 wherein said load comprises an article carrying fixture.

ANDREW G. ROSE.

REFERENCES CITED

The following references are of record in the file of this patent:

UNITED STATES PATENTS

| Number | Name | Date |
| --- | --- | --- |
| 898,489 | Louden | Sept. 15, 1908 |
| 1,417,528 | Irish et al. | May 30, 1922 |
| 1,869,794 | Bell | Aug. 2, 1932 |
| 2,033,695 | Emerson | Mar. 10, 1936 |
| 2,052,748 | Bowers | Sept. 1, 1936 |
| 2,067,981 | Ohlson | Jan. 19, 1937 |